(12) United States Patent
Hurwitz

(10) Patent No.: US 7,549,399 B2
(45) Date of Patent: *Jun. 23, 2009

(54) ABRASION RESISTANT OMNIDIRECTIONALLY REFLECTIVE RETRACTABLE PET LEASH

(75) Inventor: Marni Markell Hurwitz, Far Hills, NJ (US)

(73) Assignee: Nite Glow Industries, Inc., Far Hills, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/711,995

(22) Filed: Feb. 28, 2007

(65) Prior Publication Data

US 2007/0204806 A1    Sep. 6, 2007

Related U.S. Application Data

(63) Continuation-in-part of application No. 11/185,059, filed on Jul. 20, 2005, now Pat. No. 7,204,206, which is a continuation-in-part of application No. 11/067,442, filed on Feb. 25, 2005, now Pat. No. 6,978,738, which is a continuation-in-part of application No. 10/935,687, filed on Sep. 8, 2004, now Pat. No. 6,925,965.

(60) Provisional application No. 60/591,936, filed on Jul. 28, 2004.

(51) Int. Cl.
    *A01K 27/00* (2006.01)
(52) U.S. Cl. ..................................... 119/796
(58) Field of Classification Search .......... 119/796, 119/794, 795
    See application file for complete search history.

(56) References Cited

U.S. PATENT DOCUMENTS

| 3,176,584 A | 4/1965 | De vries | 359/539 |
|---|---|---|---|
| 3,190,178 A | 6/1965 | McKenzie | 359/514 |
| 3,871,336 A | 3/1975 | Bergman | 119/106 |
| 3,999,521 A | 12/1976 | Puiello | 359/518 |
| 4,025,159 A | 5/1977 | McGrath | 359/514 |
| 4,167,156 A | 9/1979 | Kupperman | 119/795 |
| 4,173,201 A | 11/1979 | Chao | 119/859 |
| 4,384,548 A | 5/1983 | Cohn | 359/518 |
| 4,407,233 A | 10/1983 | Bozzacco | 359/518 |
| 4,513,692 A | 4/1985 | Kuhnsman | 119/797 |
| 4,576,850 A | 3/1986 | Martens | 428/156 |

(Continued)

*Primary Examiner*—Son T. Nguyen
(74) *Attorney, Agent, or Firm*—Ernest D. Buff & Associates, LLC; Ernest D. Buff

(57) ABSTRACT

A flexible abrasion resistant omnidirectionally reflective retractable pet leash has an omnidirectionally reflective leash housed within a retractable housing device. The omnidirectionally reflective leash reflects incoming light beams back in the direction from which they emanated. This retractable leash is created by surrounding a central braided rope of nylon or polyethylene fibers with a cylindrically braided reflective sleeve that is coated with an abrasion resistant transparent polymeric coating. The braided reflective sleeve consists of narrow width reflective strips that comprise a woven or knitted narrow width strip and a flexible nylon retroreflective sheet sewn thereon. The flexible retroreflective sheet is formed by thermally bonding corner cube, microsphere retroreflectors, or wide angle exposed retroreflective lenses to a flexible polymeric sheet. The braided construction enables the leash to reflect light omnidirectionally over a large angle of acceptance, thereby providing an improved measure of safety for both pet and handler.

33 Claims, 9 Drawing Sheets

U.S. PATENT DOCUMENTS

| | | | |
|---|---|---|---|
| 4,582,885 A | 4/1986 | Barber | 528/28 |
| 4,668,558 A | 5/1987 | Barber | 428/156 |
| 4,763,985 A | 8/1988 | Bingham | 359/518 |
| 4,815,818 A | 3/1989 | Thomas | 359/546 |
| 4,887,552 A | 12/1989 | Hayden | 119/793 |
| 4,895,110 A | 1/1990 | LoCascio | 119/859 |
| 4,950,525 A | 8/1990 | Bailey | 428/164 |
| 4,957,335 A | 9/1990 | Kuney | 359/541 |
| 5,046,456 A | 9/1991 | Heyman | 119/859 |
| 5,066,098 A | 11/1991 | Kult et al. | 359/540 |
| 5,117,304 A | 5/1992 | Huang et al. | 359/529 |
| 5,140,946 A | 8/1992 | Pennock | 119/859 |
| 5,200,262 A | 4/1993 | Li | 442/379 |
| 5,237,448 A | 8/1993 | Spencer | 119/792 |
| 5,243,457 A | 9/1993 | Spencer | 119/795 |
| 5,283,101 A | 2/1994 | Li | 428/141 |
| 5,370,082 A | 12/1994 | Wade | 119/859 |
| 5,377,626 A * | 1/1995 | Kilsby et al. | 119/796 |
| 5,429,075 A | 7/1995 | Passarella | 119/795 |
| 5,523,927 A | 6/1996 | Gokey | 362/103 |
| 5,535,106 A | 7/1996 | Tangen | 362/108 |
| 5,558,044 A | 9/1996 | Nasser, Jr. | 119/796 |
| 5,630,382 A | 5/1997 | Barbera | 199/859 |
| 5,762,029 A | 6/1998 | DuBois | 119/796 |
| 5,777,790 A | 7/1998 | Nakajima | 359/536 |
| 5,850,807 A | 12/1998 | Keeler | 119/799 |
| 5,882,796 A | 3/1999 | Wilson et al. | 428/411.1 |
| 5,910,858 A | 6/1999 | Frey | 359/534 |
| 5,926,314 A | 7/1999 | Smith et al. | 359/530 |
| 5,962,108 A | 10/1999 | Nestegard et al. | 428/172 |
| 5,967,095 A | 10/1999 | Greves | 119/795 |
| 6,070,556 A | 6/2000 | Edwards | 119/792 |
| 6,159,537 A | 12/2000 | Crandall | 427/163.4 |
| 6,170,968 B1 | 1/2001 | Caswell | 362/469 |
| 6,289,849 B1 | 9/2001 | Macedo | 119/796 |
| 6,557,498 B1 | 5/2003 | Smierciak | 119/858 |
| 6,677,028 B1 | 1/2004 | Lasch et al. | 428/161 |

* cited by examiner

ABRASION RESISTANT OMNIDIRECTIONALLY REFLECTIVE RETRACTABLE PET LEASH

CROSS-REFERENCE TO RELATED APPLICATIONS

This application is a continuation-in-part of U.S. application Ser. No. 11/185,059, filed Jul. 20, 2005, now U.S. Pat. No. 7,204,206 which, in turn is a continuation-in-part of U.S. application Ser. No. 11/067,442, filed Feb. 25, 2005, now U.S. Pat. No. 6,978,738, which, in turn is a continuation-in-part of U.S. application Ser. No. 10/935,687, filed Sep. 8, 2004, now U.S. Pat. No. 6,925,965, which, in turn, claims the benefit of Application No. 60/591,936, filed Jul. 28, 2004.

BACKGROUND OF THE INVENTION

1. Field of the Invention

The present invention relates to pet leashes; and more particularly, to an abrasion resistant omnidirectionally reflective retractable pet leash especially suited for use during dusk or nighttime hours to enhance safety of pets and their owners while walking in the vicinity of land vehicles.

2. Description of the Prior Art

Walking a pet during dusk or nighttime hours can be hazardous in neighborhoods where automobiles are encountered. Illuminating characteristics of the automobile headlamps, generally afford an illumination range of approximately 25 to 50 feet. This illumination range can be significantly reduced by mist or fog, or bends in the road. Despite improvements to vehicle headlights, pets and their owners are oftentimes not recognized by automobile drivers until the distance between the automobile and the pet is small.

Several approaches devised by prior art workers attempt to provide solutions for this hazardous common activity. These approaches include 1) use of pet collars that are illuminated or reflective; 2) use of leashes which are illuminated or reflective; or 3) a combination of both features. None of these solutions suggest indicating the whereabouts of a pet owner, a leash and a pet attached to the leash via omnidirectional reflection.

Various types of illuminated dog collars using bulb or other powered sources are known in the art. These power-illuminated leashes require batteries, light bulbs or other lighting elements, which are not needed for reflective illumination. Accordingly, a detailed discussion thereof is not required.

U.S. Pat. No. 4,173,201 to Chao, et al. discloses an illuminated collar for pets and the like. U.S. Pat. No. 4,513,692 to Kuhnsman, et al. discloses an illuminated pet leash comprising a non-opaque tube that contains one or more bundles of optical fibers. U.S. Pat. No. 4,895,110 to Lo Cascio discloses a pet collar that includes a light source and a power source attached to a strap. U.S. Pat. No. 4,887,552 to Hayden discloses an electrically lighted pet leash that is composed of a transparent, flexible tube containing a string of small electric light bulbs mounted in parallel between two insulated wires. U.S. Pat. No. 5,046,456 to Heyman, et al. discloses an illuminated pet collar in which multiple lights are mounted within a flexible, light-permeable tube that extends about the perimeter of the collar. A housing mounted on one end of the tube contains a circuit and a battery for operating the lights. U.S. Pat. No. 5,140,946 to Pennock, et al. discloses an illuminated pet collar with miniature lights powered by a battery encased within a flexible, pliable, transparent plastic display tube, which are parallel-wired within the display tube. U.S. Pat. No. 5,370,082, to Wade discloses an animal collar that includes illuminating devices, such as light emitting diodes, liquid quartz strips or electric lamps powered by a plurality of solar cells. U.S. Pat. No. 5,429,075 to Passarella, et al. discloses a pet leash and flashlight combination. U.S. Pat. No. 5,523,927 to Gokey discloses an illuminated animal collar light emitting diode placed on the outer exterior of a collar powered by a battery. U.S. Pat. No. 5,535,106, issued to Tangen, discloses a lighted animal collar that includes a plurality of separate light emitting assemblies, or housings, at spaced intervals along the collar. U.S. Pat. No. 5,558,044 to Nasser, Jr. et al. discloses an illuminating leash handle with a flashlight. U.S. Pat. No. 5,630,382 to Barbera, et al. discloses an illuminated pet harness having straps with internal cavities that contain fiber optic cores illuminated by a light bulb. U.S. Pat. No. 5,762,029 to DuBois, et al. discloses a combined retractable leash and flashlight. U.S. Pat. No. 5,850,807 to Keeler discloses an illuminated pet leash, wherein illumination is remotely activated by a pet owner to locate the leash. U.S. Pat. No. 5,967,095 to Greves discloses an electroluminescence-illuminated pet flat leash strap. U.S. Pat. No. 6,170,968 to Caswell discloses a motion activated rotatable illuminator. U.S. Pat. No. 6,289,849 to Macedo, et al. discloses a device for removably attaching a flashlight to a retractable dog leash. U.S. Pat. No. 6,557,498 to Smierciak, et al. discloses a night safety pet illumination marker, with a pet collar having a series of light emitting diodes mounted around the perimeter of the collar and powered by battery power.

Various types of dog collars illuminated by reflection are known in the art. Representative dog collars of this variety are discussed below.

U.S. Pat. No. 3,871,336 to Bergman discloses a reflective dog collar which is not illuminated; but which utilizes a highly reflective material having the form of different color dots encapsulated in plastic. This illuminates only portions of the flat planar pet collar.

U.S. Pat. No. 3,999,521 to Puiello discloses a reflective safety harness for quadruped animals. The harness includes a pair of identical sheet elements with a light reflective surface mounted on opposite sides of the animal. At the corners of the sheet are fastened straps, which circumscribe the animal's body at the front and rear of the harness. Extending from the front strap, at the top point thereof, midway between the two elements, is a loop through which the dog's regular collar is passed. The arrangement assures immovable attachment of the harness on the dog's body. The disclosure by the '521 patent of a reflective sheet positioned on both sides of the animal does not suggest a pet collar or a leash that reflects incident light.

U.S. Pat. No. 4,167,156 to Kupperman, et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers.

U.S. Pat. No. 4,384,548 to Cohn discloses a safety device for animals. A pet collar uses "retro-reflective" threads with glass reflective elements in a flexible webbing to form a pet leash. The threads are said to reflect incident light directly back toward the source. Disposition of reflective threads in the webbing forming the collar is sparce. As a result, the quantum of incident light reflected is small; and an insignificant quantum of incident light is reflected back to the source.

U.S. Pat. No. 4,407,233 to Bozzaco discloses a safety collar for pets. The collar has highly reflective flexible elements with a length large enough to extend beyond the outer surface of the pet's hair. It uses flexible elements with Scotchlite reflecting strips attached to a collar. A retractable reflective pet leash is not disclosed, and the flexible elements do not reflect light in every direction.

U.S. Pat. No. 5,243,457 to Spencer discloses a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting there from at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic of prismatic construction it is rigid and is not flexible and does not form a leash that is capable of being twisted and bent. Further any twisting and bending action separates the reflective element from the luminescent element.

U.S. Pat. No. 5,237,448 to Spencer, et al. discloses a visibility enhancing material. The flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. A second layer of plastic luminescent material is contiguously and integrally attached to the underlying surface of the prism-like formations and generally coextensive therewith. The visibility enhancing material simultaneously radiates luminescent light from the second layer through the underlying surface of the prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction, it is rigid and is not flexible and does not form a leash that is capable of being retracted, twisted and bent. Furthermore, any twisting and bending action will result in separation of the reflective element from the luminescent element.

U.S. Pat. No. 6,070,556 to Edwards discloses an illuminating dog safety system. This illuminating dog safety system is designed for allowing an animal to be more visible at night. The device includes a collar that is worn around a neck of an animal. The collar has a reflective strip extending a majority of its length. A harness is provided that is adapted to be worn around a torso of the animal. The harness is comprised of an upper strap member, a lower strap member, and a longitudinal extension there between. The upper strap member, the lower strap member, and the longitudinal extension each have a reflective strip extending a majority of a length thereof. A leash is provided that is adapted for securement to the collar. The leash has a reflective strip extending a majority of its length. All these strip elements are made from flat elements, as shown in FIG. 3 of the patent disclosure. Twisting the elements does not provide the reflectivity needed for adequate visibility at night.

Numerous patents disclose reflective materials. Some of these patents disclose reflective elements having corner cube shapes embedded in a rigid or flexible polymeric strips and monolayers of spherical beads, i.e. primarily glass beads bonded to a reflective sheet.

U.S. Pat. No. 3,176,584 to DeVries, et al. discloses that a reinforcing layer may be incorporated into an embedded lens retroreflective sheeting. The reinforcing layer may be of a similar composition as the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retro-reflection.

U.S. Pat. No. 3,190,178 to McKenzie discloses a reflex reflective sheeting. It uses a monolayer of microspheres embedded in a polymer to reflect the incoming light beam in the same direction as the incident beam. Since the sheet is formed by melting of the polymeric binder, it is rigid and therefore unsuitable for flexible pet leashes.

U.S. Patent No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphers or corner cubes forming the bonded network. Retroreflective articles so constructed may be rigid and inflexible.

U.S. Pat. No. 4,576,850 to Martens, and U.S. Pat. Nos. 4,582,885, 4,668,558 to Barber disclose a shaped plastic articles having replicated microstructure surfaces. This shaped plastic article is made by crosslinked polymer with hard and soft segments having a microstructure-bearing surface that is replicated, with a castable fluid, and radiation hardened. Articles formed by this process exhibit, a retroreflective cube-corner sheeting, Fresnel lens or video disc. All these formed articles are rigid and therefore unsuitable for use in retractable pet leashes. Moreover, these articles also exhibit low tear strength.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,815,818 to Thomas discloses three-dimensional flexible reflectors. The reflector is provided with elastomeric resilient member with a plurality of embedded retroreflective glass beads. A portion of the outer surface of the elastomeric material is removed to expose the glass beads. The exterior surface of the glass beads at the outer surface is exposed and is subject to abrasion.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises a clear thermoplastic elastomeric aliphatic polyurethane.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18-23) that variation in the size of the microspheres will increase the observation angle or divergence angle of the resultant retro-reflective article.

U.S. Pat. No. 5,066,098 to Kult, et al. discloses cellular encapsulated-lens high whiteness retroreflective sheeting with a flexible cover sheet. This cellular, encapsulated-lens retroreflective sheeting comprises a base sheet of a monolayer of retroreflective elements that is partially embedded in a binder layer which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for retractable pet leashes, which require structures that can twist and flex.

U.S. Pat. No. 5,117,304 to Huang, et al. discloses a retroreflective article. The retroreflective article has corner cubes and is flexible, and can be applied over irregular surfaces by using an optically clear, aliphatic polyurethane polymer. The aliphatic polymer has a plurality of hard chain segments having the formula —C(O)N(H)—$C_6H_{10}$—N(H)C(O)—.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity.

U.S. Pat. No. 5,882,796 to Wilson, et al. discloses bonded structured retroreflective sheeting. The structured retroreflective sheeting includes an array of corner cube structured retroreflective elements, a thermoplastic sealing film located proximate the structured elements, and bonding agent between the sealing film and the structured retroreflective elements. The bonding agent bonds the sealing film to the structured retroreflective film. This bonded structure is rigid and is unlikely to survive the flexing and twisting movements of a retractable pet leash.

U.S. Pat. No. 5,926,314 to Smith, et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective leashes.

U.S. Pat. No. 5,962,108 to Nestegard, et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly (methylmethacrylate); polycarbonates; cellulosics; polyesters such as poly(butyleneterephthalate); poly (ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a retractable pet leash.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use in retractable pet leashes, or pet leashed in general.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer and does not provide abrasion resistance.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear.

Notwithstanding the efforts of prior art workers to construct pet leashes, retractable pet leashes, and pet collars that are illuminated by incident light, there remains a need in the art for a flexible abrasion resistant retractable pet leash that omnidirectionally reflects a significant quantum of incoming light back to its source. Numerous methods for producing retroreflectors have been disclosed. A flexible retractable pet leash having a robust construction that withstands tensile and torsional forces attending leash usage, has long been needed in the art. Also needed is a flexible, omnidirectional abrasion resistant retractable pet leash capable of maintaining high reflectivity when subjected to surface abrasion from frictional forces created by contact of the leash with objects having rough exteriors, such as the ground, flooring, posts, trees and the like.

SUMMARY OF THE INVENTION

The present invention provides a retractable pet leash that is abrasion resistant and omnidirectionally reflective. Omnidirectional reflectivity is provided by the incorporation of retroreflective corner cube reflectors or microsphere reflective elements thermally bonded onto a nylon mesh strip to form a flexible nylon retroreflective sheet, which is in turn sewn onto a narrow width reflective strip. With this structure, the leash reflects a significant quantum of the incident light from a car head light or other light emitting element back to the source.

The abrasion resistance property of an embodiment of the retractable pet leash is provided by a transparent coating. One such coating comprises a polymer that is transparent, flexible and has a refractive index significantly smaller than that of the retroreflective elements used. Abrasion resistance and omnidirectional reflectivity is achieved by: a) creating a flexible retroreflective sheet comprising a plurality of corner cube reflectors bonded via a transparent bond to a flexible polymeric sheet, or several microspheres bonded via a transparent bond to a reflectorized flexible polymeric sheet; b) producing a narrow width strip composed of nylon or polypropylene fibers by knitting, weaving or braiding, to achieve a strip width in the range of 0.0065 inch to 0.25 inch, depending upon the size of the central cylindrical rope core; c) thermally bonding a flexible retroreflective sheet onto a nylon mesh strip to form a flexible nylon retroreflective sheet which is in turn sewn onto a show surface of the narrow width strip, thereby forming a narrow width reflective strip; d) cylindrically braiding, at a shallow braid angle, three or more narrow width reflective strips to surround and cover the external surface of a central cylindrical leash core made from braided nylon or polypropylene fibers; e) forming a cylindrical retroreflective braided sleeve integrally surrounding a central cylindrical leash core to thereby create a leash having an external retroreflector surface; and f) coating the external surface of the cylindrical retroreflective braided sleeve with a transparent, flexible abrasion resistant coating having a refractive index significantly less than that of the retroreflective elements. The thickness of the transparent abrasion resistant coating is in the range of 0.002 to 0.010 inches.

The retractable pet leash has a central section, a proximal end and a distal end. The transparent abrasion resistant coating may be applied to the entire length of the pet leash between the proximal and distal ends (i.e. the central section). The proximal end of the retractable pet leash is fixedly connected to a reel that is located in an internal chamber of a retractable housing device. The retractable housing device is constructed with a handle portion, a retraction control member actuated by a retraction control switch, a housing body appointed with the internal chamber having the reel member therein mounted, and an extension-retraction aperture. An extension leash appends from the extension-retraction aperture of the retractable housing device. The extension leash is appointed to accommodate a hardware component operable with a pet collar.

The proximal end of the pet leash is retained by the reel member so that the proximal end is wrapped around and engages with the reel member. The distal end is attached to the extension leash. The central section of the retractable leash is releaseably spirally arranged within the internal chamber when the retractable leash is in a retracted position. Conversely, the central section of the retractable leash extends from the internal chamber and traverses the extension-retraction aperture when the retractable leash is in an extended position.

The extension leash is appointed to accommodate a hardware component operable with a pet collar. Preferably, the extension leash includes reflective properties therein. Most preferably, the extension leash is an omnidirectionally reflective extension leash constructed with a cylindrical reflective braided extension sleeve comprising three or more narrow width reflective strips braided at a shallow cylindrical braid angle and being operable to surround a central cylindrical braided extension rope core thereby providing omnidirectional reflectivity to the extension leash. Preferably, the cylindrical reflective braided extension sleeve of the omnidirectionally reflective extension leash is substantially coated with a conformal transparent polymeric abrasion resistant coating.

Alternatively, the extension leash is composed attached to mechanical hardware, such as a metallic ring, forming a choke collar that encircles the neck of the pet creating a retroreflective collar. In another second embodiment, the extension leash has an adjustable metallic strip with one or more holes that lock with a pet leash clamp forming a reflective pet collar that is non-choking.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the thermally bonded narrow width strips at a shallow angle with respect to the length of the cylindrical central core. As a result the leash can be readily flexed or twisted due to the relative movement provided within the cylindrical braid sleeve structure. The flexibility of the transparent abrasion resistant coating provides for flexing and twisting movement of the abrasion resistant pet leash without coating separation or delamination.

The external surface of the cylindrical retroreflective braided sleeve is coated with a transparent, flexible abrasion resistant polymeric coating. The coating has a refractive index significantly lesser than that of retroreflective elements. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

In another embodiment the reflective retractable pet leash comprises a central cylindrical braided rope core and a cylindrical reflective braided sleeve comprising three or more narrow width reflective strips that are braided at a shallow cylindrical braid angle that is operable to surround the central cylindrical braided rope core thereby providing omnidirectional reflectivity. The narrow width reflective strips comprise a woven or knitted narrow width strip and a flexible nylon retroreflective sheet sewn thereon. The woven or knitted narrow width strip has a show surface. The flexible retroreflective nylon sheet comprises a flexible retroreflective sheet thermally bonded onto a nylon mesh strip, and the nylon mesh strip is sewn onto the show surface of the narrow width reflective strip. Additionally, the flexible retroreflective sheet has retroreflectors bonded thereto with a transparent bond layer. In an alternative construction, there is used an advanced reflective and coating technology wherein microscopic reflectors are embedded into the braided weave of a fabric. These microscopic reflectors operate collectively to provide a reflective medium that acts like smooth mirrors, enabling reflection of light back to its source. With this construction, the fabric remains supple, facilitating extension and retraction of the leash. One material that has been found to be especially well suited for this purpose is sold by Reflective Technologies Inc. under the tradename illumNITE.

The reflective retractable pet leash further comprises a retractable housing device having a handle portion, a retraction control member actuated by a retraction control switch, a housing body with an internal chamber appointed with a reel member, and an extension-retraction aperture. An extension leash is provided, which is appointed to append from the extension-retraction aperture of the retractable housing device and is appointed to accommodate a hardware component operable with a pet collar. Finally, the retractable leash has a central section, a proximal end and a distal end. The proximal end is retained by the reel member so that the proximal end is wrapped around and engages with the reel member, while the distal end is attached to the extension leash. The central section of the retractable leash is releaseably spirally arranged within the internal chamber when the retractable leash is in a retracted position. The central section of the retractable leash extends from the internal chamber and traverses the extension-retraction aperture when the retractable leash is in an extended position.

A process for manufacture of a reflective retractable pet leash is provided comprising the first set of steps for forming the omnidirectionally reflective pet leash structure, including: (i) selecting a braided nylon or polypropylene cylindrical central rope, the cylindrical central rope having an external surface; (ii) selecting a flexible polymer sheet; (iii) coating the flexible polymer sheet with a plurality of retroreflectors using a transparent binder to form a retroreflector coated flexible polymer sheet; (iv) thermally bonding the retroreflector coated flexible polymer sheet to a nylon mesh strip to form a flexible nylon retroreflective sheet; (v) sowing the flexible nylon retroreflective sheet to a narrow width reflective strip; (vi) braiding at least three of the narrow width reflective strips at a shallow cylindrical braid angle to form an omnidirectionally reflective sleeve having a braided construction; and (vii) covering the external surface of the cylindrical central rope with the omnidirectionally reflective sleeve to form a pet leash with omnidirectional reflectivity having a central section, a proximal end and a distal end. The process for manufacture of a reflective retractable pet leash further comprises a second set of steps for integrating the resultant omnidirectionally reflective pet leash into a retracting device so as to form the omnidirectionally reflective retractable pet leash, and includes the following steps: (i) attaching the proximal end of the pet leash to a reel member; (ii) fixing the reel member within an internal chamber of a retractable housing device, the retractable housing device having a handle portion, a retraction control member actuated by a retraction control switch, a housing body with the internal chamber appointed with the reel member, and an extension-retraction aperture; (iii) winding the reel member so that the proximal end becomes wrapped around the reel member and the central section of the pet leash is releaseably spirally arranged within the internal chamber of the retractable housing; (iv) inserting the distal end of the pet leash within the extension-retraction aperture; and (v) attaching the distal end of the pet leash to an extension leash being appointed to append from the extension-retraction aperture of the retractable housing device and being appointed to accommodate a hardware component operable with a pet collar, the pet leash engaging with the reel member and the extension leash to operate in retracted and extended positions.

The omnidirectionally reflective pet leash is operable to sustain abrasion, substantial tensile forces, and to accommodate twist and flexure forces due to strength and movement afforded by the braided construction of the omnidirectionally reflective sleeve. The central section of the pet leash is releaseably spirally arranged within the internal chamber when the pet leash is in a retracted position, and the central section of the pet leash extends from the internal chamber and traverses the extension-retraction aperture when the pet leash is in an extended position.

The retractable leash comprises a cylindrical reflective braided sleeve having three or more narrow width reflective strips that are braided at a shallow cylindrical braid angle, said cylindrical reflective braided sleeve being operable to surround the central cylindrical braided rope core thereby providing omnidirectional reflectivity. Each narrow width reflective strip has a flexible nylon retroreflective sheet sewn to their show surface. The flexible nylon retroreflective sheet is formed by thermally bonding a retroreflector coated flexible polymer sheet to a nylon mesh strip.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Figure 1A:
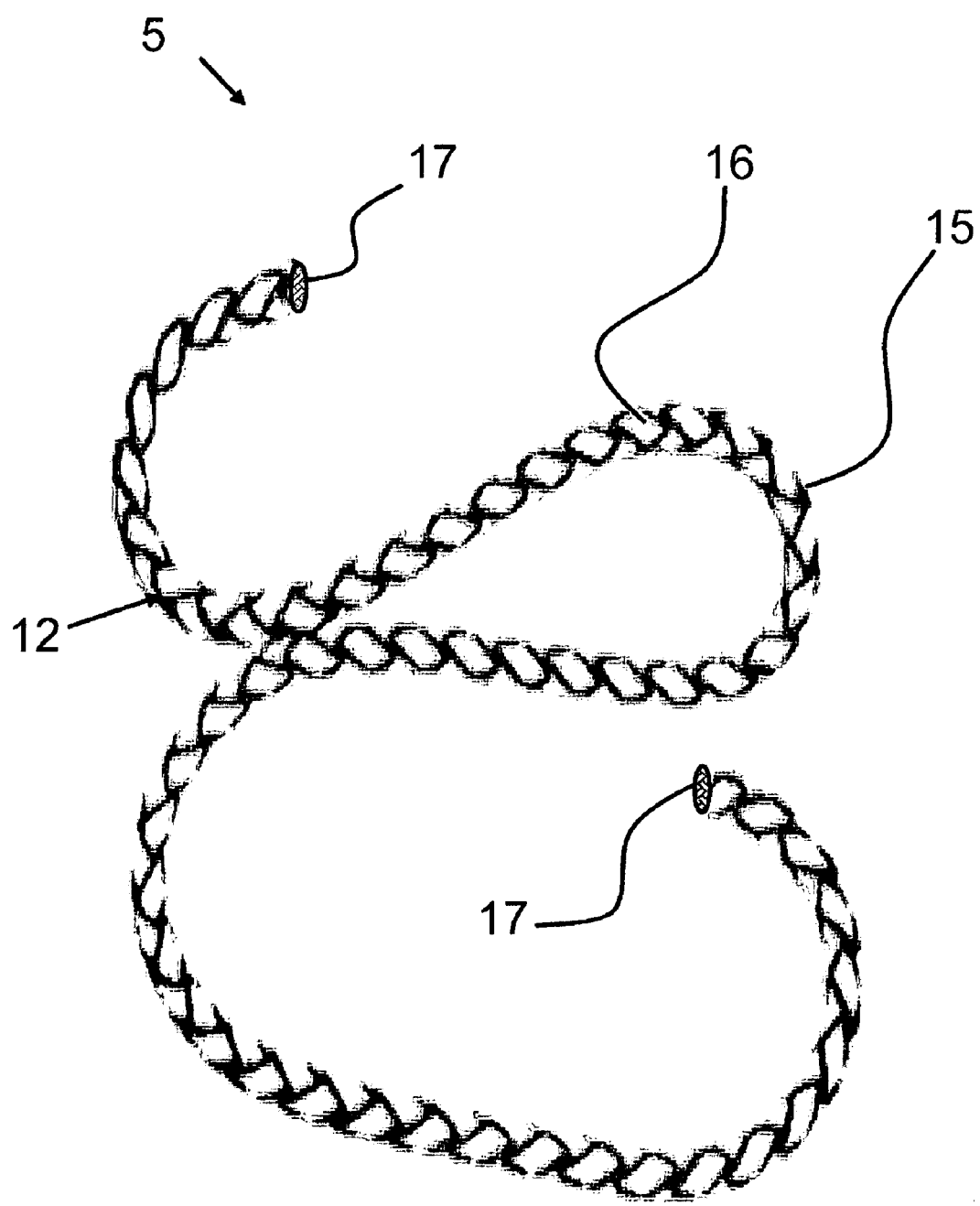
FIG. 1a is a photograph showing a portion of the central section of the omnidirectionally reflective retractable pet leash taken with camera flash light showing reflective portions as bright regions.

The present invention provides an abrasion resistant retractable pet leash that is flexible, twistable and omnidirectionally reflective. The retractable pet leash has a central section, a proximal end and a distal end. The proximal end of the retractable pet leash is fixedly connected to a reel that is located in an internal chamber of a retractable housing device. The retractable housing device is constructed with a handle portion, a retraction control member actuated by a retraction control switch, a housing body appointed with the internal chamber having the reel member therein mounted, and an extension-retraction aperture. An extension leash appends from the extension-retraction aperture of the retractable housing device. The extension leash is appointed to accommodate a hardware component operable with a pet collar. The proximal end of the pet leash is retained by the reel member so that the proximal end is wrapped around and engages with the reel member so that the central section of the retractable leash is releaseably spirally arranged within the internal chamber when the retractable leash is in a retracted position. Conversely, the central section of the retractable leash extends from the internal chamber and traverses the extension-retraction aperture when the retractable leash is in an extended position.

When the omnidirectionally reflective pet leash is extended from the retractable housing device, as when in use in the extended position, the pet leash omnidirectionally reflects incident light back to its source, thereby clearly defining the pet leash. Moreover, wherein the extension portion and the pet collar is further constructed with the subject omnidirectional properties, the pet leash and the neck portion of the pet that carries the choke collar are all clearly defined by the reflecting incident light. This increases the margin of safety in dusk or night time environments when a car headlight can illuminate the owner walking a pet and the pet, reducing the possibility of accidents. Since the omnidirectionally reflecting retractable pet leash reflects light over a broad range, due to its reflective cylindrical sleeve arrangement, the headlight can be at a significant angle and could still be reflected back.

The abrasion resistant omnidirectional pet leash is constructed by building a cylindrically reflective sleeve from narrow width strips of nylon or polypropylene. Reflectivity is achieved by first selecting a flexible polymer sheet and coating the flexible polymer sheet with a plurality of retroreflectors using a transparent binder to form a retroreflector coated flexible polymer sheet. The retroreflector coated flexible polymer sheet is then thermally bonded to a nylon mesh strip to form a flexible nylon retroreflective sheet. The flexible nylon retroreflective sheet is then sewn onto a show surface of a narrow width reflective strip. At least three of these narrow width reflective strips are braided at a shallow cylindrical braid angle to form an omnidirectionally reflective sleeve having a braided construction.

The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. In either case, the retroreflective elements are bonded to the flexible sheet using a transparent binder.

The flexible sheet with retroreflective elements is available from 3M Corporation. The trade name for this product is SCOTCHLITE and the flexible polymer is typically PVC. The product is available in a variety of sizes. The flexible reflectorized sheets may be delivered onto another material by way of utilizing transfer films. These transfer films are composed of retroreflector elements bonded to a variety of heat-activated adhesives. The retroreflector elements include wide angle, exposed retroreflective lenses bonded to a heat activated polyurethane adhesive. The reflective surface is protected by a white paper liner for ease in handling prior to lamination. A plastic liner protects the adhesive side and must be removed before lamination onto the nylon mesh strip. This flexible reflectorized sheet is thermally bonded to a nylon mesh strip, woven or knitted to form a flexible nylon retroreflective sheet.

The nylon mesh strip may have a width of 0.0165 cm to 0.635 cm (0.0065 inches to 0.25 inches) and is thermally bonded to a SCOTCHLITE strip having a width slightly less than the width of the nylon mesh strip. The SCOTCHLITE strip is bonded the entire length of the nylon mesh strip, and is bonded centrally on the nylon mesh strip, so that there are equal side portions of the nylon mesh strip on both sides of the SCOTCHLITE strip. The side portions are then sewn to a narrow width strip. The thermal bonding binder may be selected from a number of polymeric binders including, but not limited to, polyvinyl chloride, polyethylene, polyurethane, polyvinyl acetate or acrylates.

The SCOTCHLITE™ reflective material is composed of a wide angle, exposed retroreflective lenses bonded to a heat activated polyurethane adhesive. Alternately, the reflective material is composed of a wide angle, exposed retroreflective lenses bonded to bond to durable cloth backing comprised of 65% polyester, and 35% cotton, which is then treated with a polyurethane adhesive and thereby thermally bonded to a nylon mesh strip.

The SCOTCHLITE™ reflective material with the durable cloth backing is then thermally bonded onto a nylon mesh strip to form a flexible nylon retroreflective sheet. The flexible nylon retroreflective sheet is sewn onto a narrow width reflective strip by sewing using a lockstitch with no more than 12 stitches 2.54 cm (per 1 inch), and not less than 2 mm (5/64 inches) from the edge of the reflective fabric. The flexible nylon retroreflective sheet is highly flexible and can be cylindrically braided, for example, through the braiding of the narrow width strip to which it is attached via sewn to the surface thereof. At least three of these narrow width reflective strips are braided at a shallow cylindrical braid angle to form an omnidirectionally reflective sleeve having a braided construction surrounding a central rope core of the leash, which substantially sustains the pet pulling tensile forces.

An alternative construction of the retractable omnidirectionally reflective leash utilizes an advanced reflective and coating technology wherein microscopic reflectors are embedded into the braided weave of a fabric. These microscopic reflectors act like smooth mirrors which operate collectively to provide a reflective medium. Due to the braided weave of the fabric and the arrangement of the microscopic reflectors light incident thereon from virtually any angle is reflected back to its source. Advantageously, with this construction, the fabric remains supple, facilitating extension and retraction of the leash. One material that has been found to be especially well suited for this purpose is sold by Reflective Technologies Inc. under the tradename illumNITE.

The abrasion resistant omnidirectional retractable pet leash is constructed by building a cylindrically reflective sleeve from the narrow width strips of nylon or polypropylene having the flexible nylon retroreflective sheets sewn thereto. The cylindrical braiding employs three or more narrow width strips. The cylindrical braiding is accomplished with a small angle between narrow width strips and the longitudinal direction of the central core rope. The proximal end of the central core of the leash is fashioned to form a loop representing a handle, and the distal end is formed to go through a metallic loop to create a choke leash. The cylindrical braiding is accomplished to cover the entire length of the pet leash, including the handle and the choke collar hardware. The ends of the braid are terminated by permanent bonding.

In an alternate embodiment, the extension leash is an omnidirectionally reflective extension leash constructed with the cylindrical reflective braided extension sleeve construction comprising three or more narrow width reflective strips braided at a shallow cylindrical braid angle and being operable to surround a central cylindrical braided extension rope core thereby providing omnidirectional reflectivity to the extension leash. Preferably, the cylindrical reflective braided extension sleeve of the omnidirectionally reflective extension leash is substantially coated with the conformal transparent polymeric abrasion resistant coating. Additionally, the omnidirectionally reflective extension leash may be constructed so that the extension leash has an end being looped and braided and attached to the hardware component to form a pet collar having omnidirectional reflectivity, and basically having choke functionality. In another embodiment, the hardware component of the extension leash comprises an adjustable metallic tab having a plurality of apertures connected to a pet leash clamp thereby forming a pet collar having non-choke functionality and omnidirectional reflectivity. In yet another embodiment, the extension leash's hardware component may comprise a clasp appointed to be releaseably connected to a pet collar; and preferably the pet collar is omnidirectionally reflective.

Reflective material is bonded to a heat activated adhesive to form a transfer film. Alternatively, reflective material may be comprised of glass beads, partially embedded in fabric and coated with a polymer matrix, while still providing exposure of the glass beads to promote optics to form a fabric. The fabric is metalized with silver for abrasion and for industrial use. The reflective material may be impregnated with aluminum, which stands up well to home washing and works well with abrasion protection. The fabric may be laminated with a polyester film (mesh) in back for sewing purposes, and further treated with a heat activated adhesive for thermally bonding to a surface. For example, SCOTCHLITE™ reflective material utilizing silver fabric metalized with aluminum may be utilized. The reflective material by SCOTCHLITE™ sold as transfer film 8710- silver transfer film or, alternatively, 8910 silver fabric, may be utilized. An example of a transfer film and a fabric commercial reflective material by SCOTCHLITE™ is illustrated below:

TABLE A

| Product Name | Daytime Color | Reflected Color | Abrasion |
| --- | --- | --- | --- |
| 8710 Silver Transfer Film | Silver | White | EN 530 Method 2/ 5000 cycles |
| 8910 Silver Fabric | Silver | White | EN 530 Method 2/ 5000 cycles |

* SCOTCHLITE ™ is certified to meet ANSI/ISEA 1-7-1999 Level 2 retroreflective performance and EN 471 Class 2 retroreflective performance.

A transparent abrasion resistant coating is applied to the outer surface of the cylindrically reflective braided sleeve of the pet leash and is applied as a substantially conformal coating. The reflective strips have retroreflective elements embedded in the strips having a corner cube prismatic or microsphere geometry. These transparent retroreflective elements are made from high refractive index transparent materials such as barium oxide- titanium oxide containing glasses. They exhibit a refractive index in the range of 1.9 to 2.2. The transparent abrasion resistant polymeric coating is selected to have a refractive index, which is significantly less than that of the retrorefractive elements. As a result, the incident and reflected light path is not significantly altered even when the incident beam is inclined to the reflective strips. The internal reflection process within the retroreflective elements is not deteriorated by the transparent abrasion resistant coating. The polymers suitable for use with the transparent abrasion resistant coating have a refractive index in the range of 1.3 to 1.55.

In addition to this refractive index requirement, the transparent abrasion resistant coating must exhibit excellent mechanical properties, including tensile strength and elongation, in order to provide the required abrasion resistance. The polymer coating must also exhibit superior bond properties to the retroreflective elements and the underlying polymeric sheet of the reflective strip. If the bond properties are poor, the transparent abrasion resistant coating may delaminate when the pet leash is subjected to abrasion or flexing and twisting movement. The transparent abrasion resistant coating must have low elastic modulus so that it remains flexible when the pet leash is twisted, retracted, extended, and spiraled within the retractable housing device. A high modulus transparent abrasion resistant coating is not desired since it applies significant stresses at the coating—reflective tape interface resulting in deterioration or fracture of the retroreflective elements.

A number of polymer systems meet these requirements. These polymers may be applied by dipping the cylindrically braided pet leash in a polymeric melt or by spraying a polymer composition dissolved in a suitable solvent. Thermosetting resin compositions such as two-component polyurethane may be painted or sprayed over the cylindrically braided reflective outer surface of the pet leash. In Table B below there are listed a number of transparent polymer compositions suitable for the pet leash abrasion resistant coating. Also listed are the refractive indexes for the compositions.

TABLE B

| Polymer Name | Refractive Index |
| --- | --- |
| aliphatic thermoplastic polyurethanes | 1.35 to 1.45 |
| Dow Corning OE-4100 Silicone elastomer | 1.4751 |
| Polymethyl tetradecyl siloxane | 1.4550 |
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexibility ultraviolet radiation degradation resistance. Typically, aliphatic polyurethane has the structure

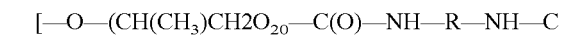
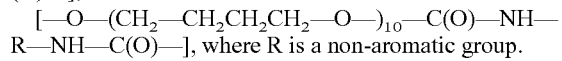

$[-O-(CH(CH_3)CH2O_{20}-C(O)-NH-R-NH-C(O)-]$; or $[-O-(CH_2-CH_2CH_2CH_2-O-)_{10}-C(O)-NH-R-NH-C(O)-]$, where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent.

www.setcochemicals.net/resins4.htm discloses a flexible room temperature curing polyurethane coating designated ROTOTHANE® 9020. This coating adheres to plastics and leather.

Dow Corning supplies a number of silicone compositions suitable for coating the cylindrically braided reflective strips to provide abrasion resistance. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table C below there are shown some of the conformal silicone coatings marketed by Dow Corning.

TABLE C

| Product Name | One part/ Two part | Viscosity CPS | Cure | Durometer |
| --- | --- | --- | --- | --- |
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C. | 64 OO |
| I-4105 | 1 | 470 | 10 min/105 C. | 65 OO |
| QI-4010 | 1 | 830 | 15 min/110 C. | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100-250 CPS, room temperature cure in reasonable time period and reasonable hardness are coating compositions 3-1965., 3-1765 and I-2620. These compositions may be dipped, brush painted or sprayed.

Of particular interest is a Dow Corning OE-4100 optical silicone elastomer, which cures in 2 hour at 150 C with a platinum based catalyst, as discussed in www.dowcorning.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the pet leash to form a flexible film which is resistant to twisting action of a pet leash. Polyvinyl acetate is available from Union Carbide under the trade names AYAC, AYAA, AYAF and AYAT depending upon the molecular weight of the polymer.

FIG. 1a is a photograph showing a portion of the central section of the omnidirectionally reflective retractable pet leash taken with camera flash light showing reflective portions as bright regions, shown generally at 5. The central section of the omnidirectionally reflective retractable pet leash 12 comprises a cylindrically braided sleeve created from braided narrow width reflective strips covers a central core 17 to provide omnidirectional reflectivity. This cylindrically braided sleeve, created from braided narrow width reflective strips, provides substantially the entire surface of the retractable leash with omnidirectional reflectivity. The flexible nylon retroreflective sheet is shown at 16 and the narrow width strip is shown at 15. The retractable leash completely reflects incident light in the same direction the light was emanated. Due to the cylindrical character of the reflective braided sleeve, some portion of the sleeve is always at normal orientation to the incoming light beam, that is, the direction at which the reflection from the retroreflective elements is maximized. Retroreflective elements reflect light over a large range of acceptance angles, but the reflection is at a lower intensity. This cylindrical construction effectively reflects the incoming camera flash light as shown in the photograph of FIG. 1a by the extremely bright appearance of the retroreflectors 16 (see also FIGS. 2a and 2b) of the leash.

Figure 1B:
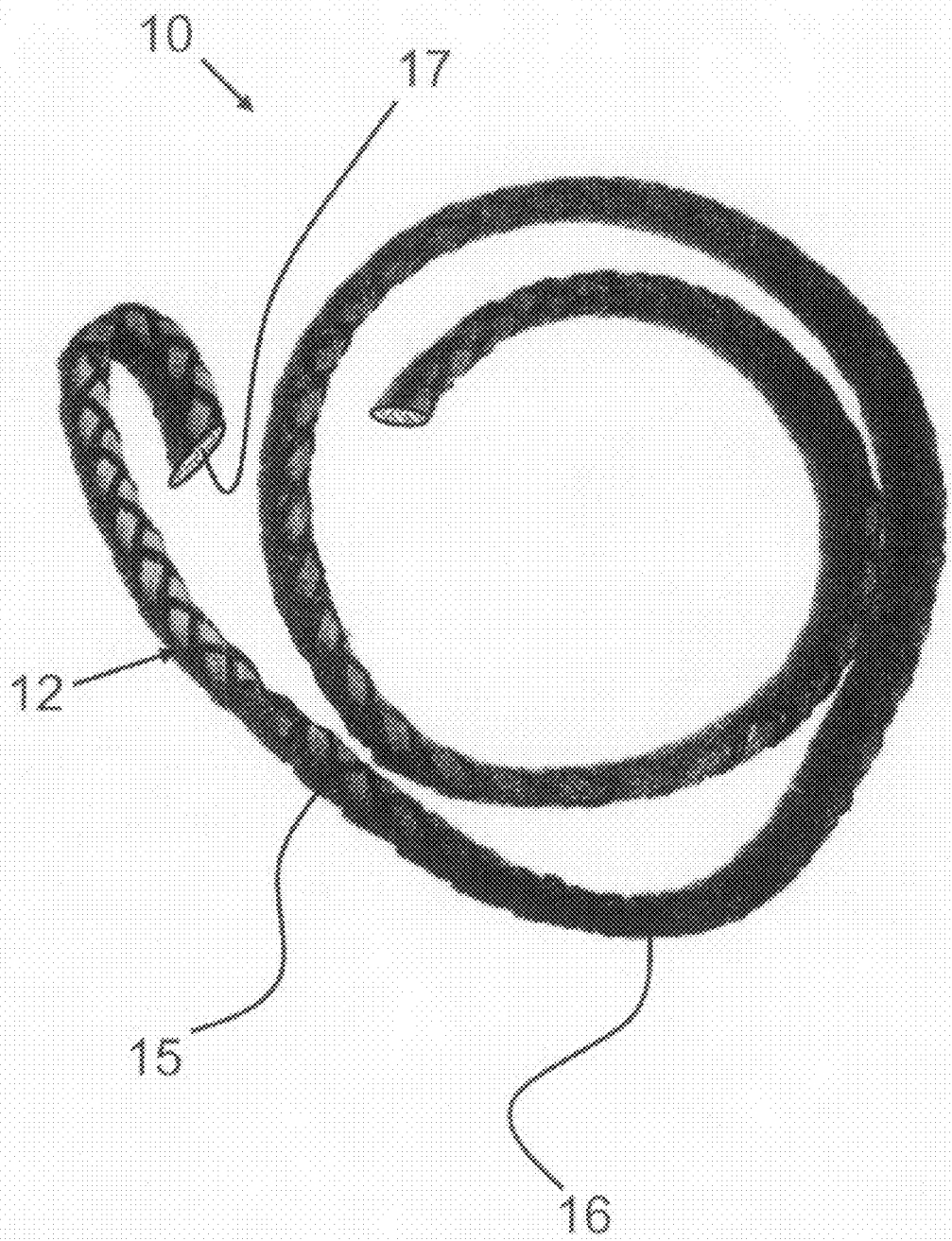
FIG. 1b is a photograph showing a portion of the central section of the omnidirectionally reflective retractable pet leash taken without camera flash light showing reflective portions as dark regions.

FIG. 1b is a photograph showing a portion of the central section of the omnidirectionally reflective retractable pet leash taken without camera flash light showing reflective portions as dark regions, shown generally at 10. The central section of the omnidirectionally reflective retractable pet leash 12 comprises the cylindrically braided sleeve created from braided narrow width reflective strips covers central core 17. The flexible nylon retroreflective sheet is shown at 16 and the narrow width strip is shown at 15. The light here, again, is reflected back to the illuminating source, and practically no light is directed in the direction of the camera. As a result, the retroreflector bright areas 16 of FIG. 1a now appear dark.

Figure 2A:
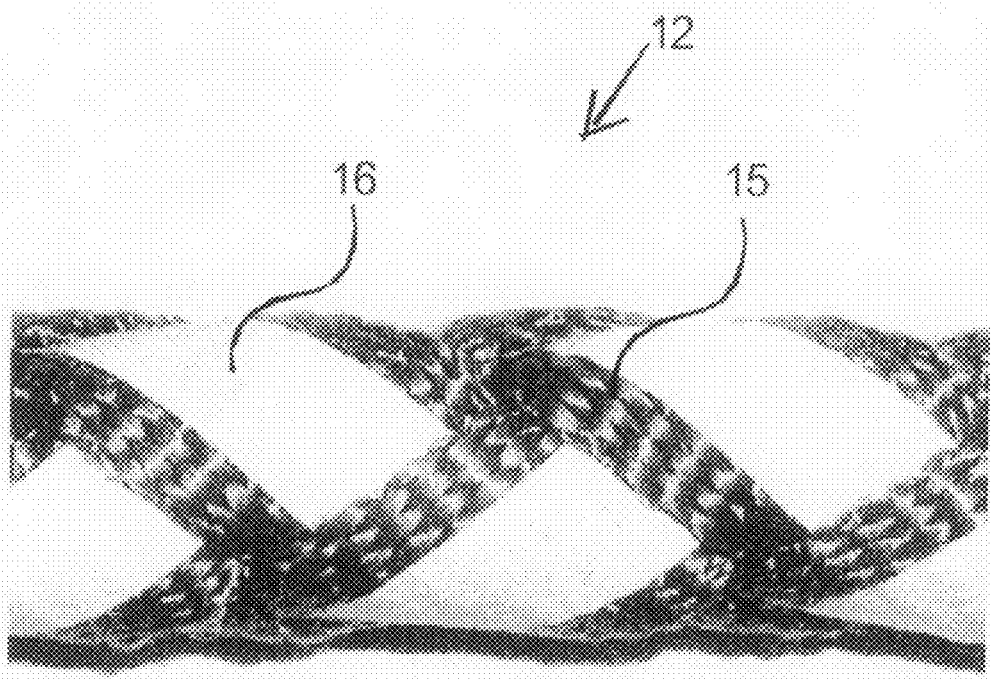
FIG. 2a is a photograph of a portion of the central section of the omnidirectionally reflective retractable pet leash illustrating the details of a transparent abrasion resistant polymeric conformal coating substantially covering the reflective cylindrical braided sleeve of narrow width strips surrounding a central pet leash core.

FIG. 2a is a photograph of magnified portion of the central pet leash section 12 of the omnidirectionally reflective retractable pet leash. The photograph shows a transparent abrasion resistant polymeric conformal coating substantially covering the reflective cylindrical braided sleeve of narrow width strips surrounding a central pet leash core. The cylindrical reflective braided sleeve is braided with a small braid angle of 5 to 10 degrees between the narrow width strips surrounding the central cylindrical rope core of the leash. The central cylindrical rope core is completely covered by the cylindrical reflective braided sleeve and therefore is invisible in the photograph. The flexible nylon retroreflective sheet is shown at 16 and the narrow width strip is shown at 15. The flexible nylon retroreflective sheet 16 is sewn onto a show surface of the narrow width strip 15 prior to cylindrical braiding operation. The outer surface of the flexible nylon retroreflective sheet 16 and the narrow width strip is covered with a transparent conformal flexible abrasion resistant coating.

Figure 2B:
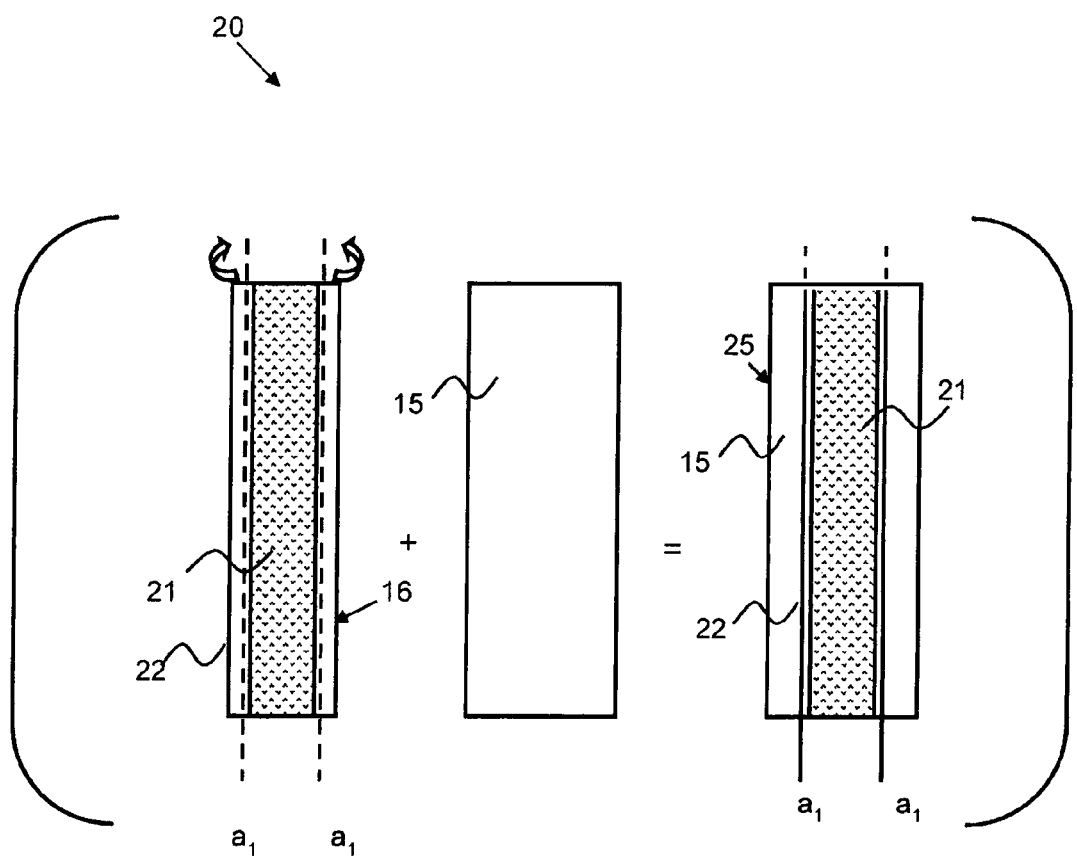
FIG. 2b schematically shows the construction of the narrow width reflective strips that are braided at a shallow cylindrical braid angle to form the omnidirectionally reflective sleeve.

FIG. 2b schematically shows the construction of the narrow width reflective strips that are braided at a shallow cylindrical braid angle to form the omnidirectionally reflective sleeve, generally shown at 20. A flexible retroreflective sheet 21 is thermally bonded onto a nylon mesh strip 22 to form a flexible nylon retroreflective sheet 16. The nylon mesh strip 22 is folded at phantom lines $a_1$ in the direction indicated by arrows. The flexible nylon retroreflective sheet 16, comprising flexible retroreflective sheet 21 thermally bonded onto nylon mesh strip 22, is then sewn onto a show surface of a narrow width strip 15 at or near $a_1$ to form a narrow width reflective strip 25. At least three of these narrow width reflective strips 25 are braided at a shallow cylindrical braid angle to form an omnidirectionally reflective sleeve having a braided construction that surrounds a central rope core and covers each of the proximal, central, and distal end sections, providing substantially the entire surface of the leash with omnidirectional reflectivity.

Figure 3:
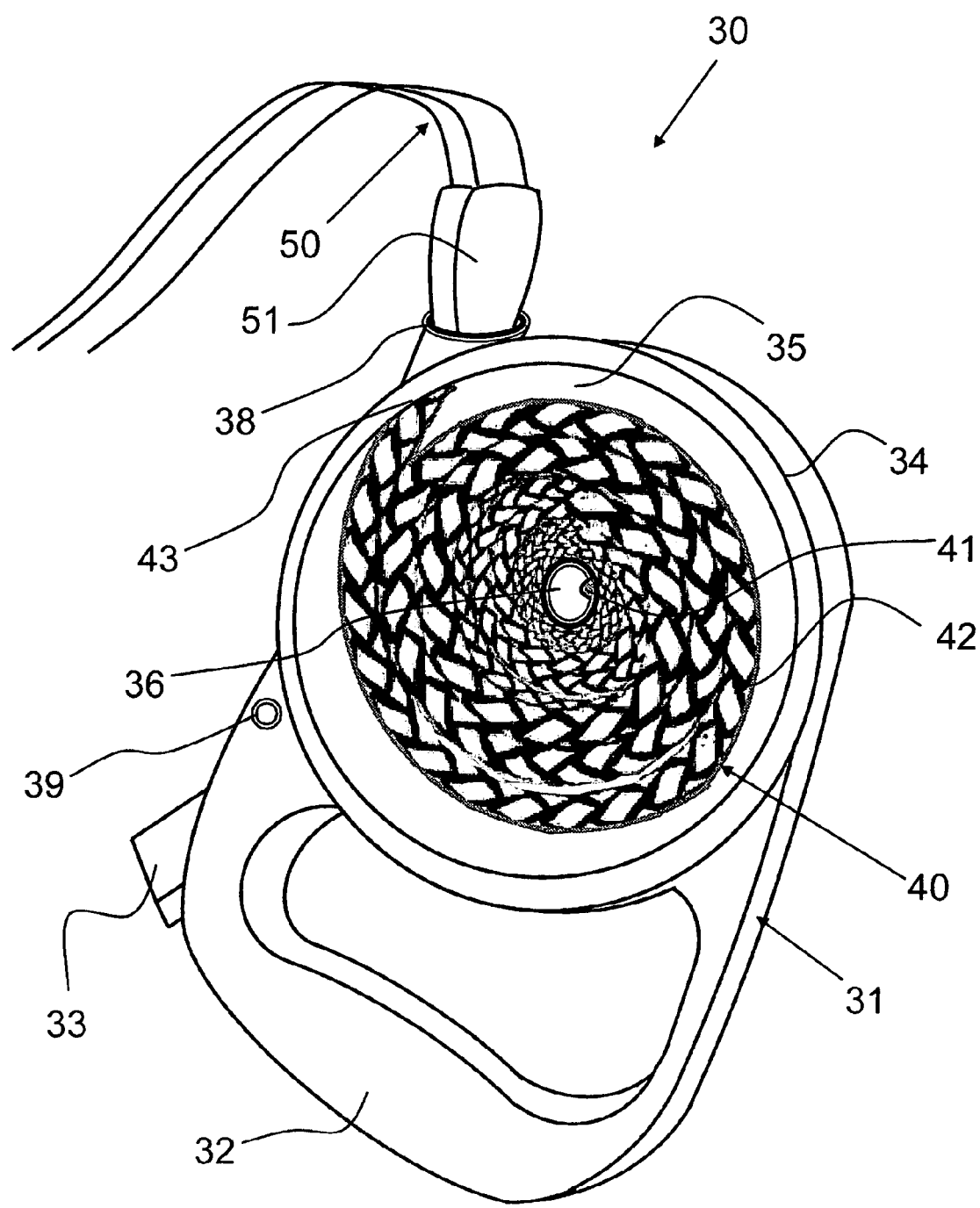
FIG. 3 is a cross sectional view of an embodiment of the omnidirectionally reflective retractable pet leash retracted within the retractable housing device, showing the omnidirectionally reflective retractable pet leash wound around a reel and being retained and housed within the internal chamber of the retractable housing, as when the leash is in a non-extended or [fully] retracted position.

FIG. 3 shows a cross sectional view of an embodiment of the omnidirectionally reflective retractable pet leash, shown generally at 30. A retractable housing device 31 is provided having a handle portion 32, a retraction control member actuated by a retraction control switch 33, a housing body 34 with an internal chamber 35, and an extension-retraction aperture 38. Internal chamber 35 is further appointed with a reel member 36. Omnidirectionally reflective retractable pet leash 40 is herein housed or retracted within internal chamber 35 of housing body 34 of retractable housing device 31. Omnidirectionally reflective retractable pet leash 40 includes a proximal end section 41, a central section 42, and a distal end section 43. Retractable housing device 31 may be composed of varying materials; preferably of a polymeric material. Reflective portions or a reflective surface may be applied to retractable housing device 31 so that same has reflective properties.

An extension leash 50 appends from the extension-retraction aperture 38 of retractable housing device 31. Extension leash 50 is appointed to accommodate a hardware component (not shown in this Fig., but see FIG. 4a) operable with a pet collar. Herein extension leash 50 is shown as a flat leash portion. Preferably, extension leash 50 includes reflective properties. Extension leash 50 is fixedly attached to distal end section 43 of omnidirectionally reflective retractable pet leash 40. A stopper 51 is provided where extension leash 50 and distal end section 43 mate. Stopper 51 prevents extension leash 50 from entering internal chamber 35 of retractable housing device 31. Extension leash 50 appends from distal end section 43, extension-retraction aperture 38, and stopper 51.

Proximal end section 41 of retractable pet leash 40 is fixedly connected to reel member 36 located in internal chamber 35 of retractable housing device 31. Retention by reel member 36 of proximal end section 41 of pet leash 40 causes proximal end section 41 to become wrapped around and engage with the reel member 36 so that central section 42 of retractable leash 40 is releaseably spirally arranged within internal chamber 35 when the retractable leash is in a retracted position. As the retraction control member actuated by retraction control switch 33 is manually released and pulling force is applied to the extension leash 50, omnidirectional leash 40 is uncoiled and gradually released from internal chamber 35, until retraction control switch 33 is manually engaged to a locking position, thus locking reel member 36 and visa vie omnidirectionally reflective leash 40. A lock 39 is also provided on retractable housing device 31 to place the reel member 36 and visa vie omnidirectionally reflective retractable leash 40 in a locked position preventing further feed or extension and/or retraction of pet leash 40. Portions of central section 42 of retractable leash 40 are released from internal chamber 35 and traverse extension-retraction aperture 38 when retractable leash 40 is in the extended position. Coiling or spiraling of the omnidirectionally reflective leash 40 allows for retract-ability; sizing of the leash 40 may vary.

Figure 4A:
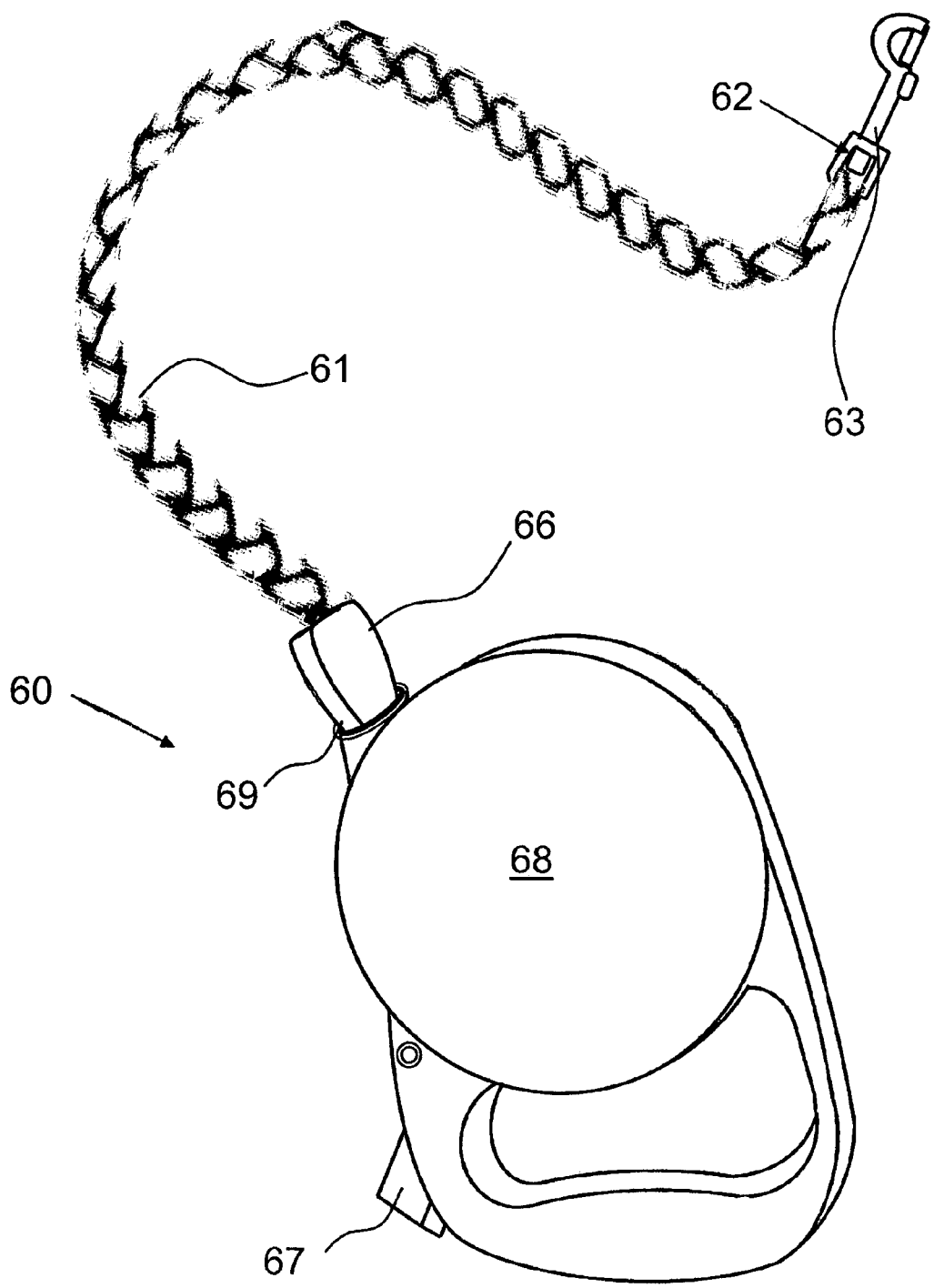
FIG. 4a is a top plane view of another embodiment of the omnidirectionally reflective retractable pet leash, showing the extension leash as an omnidirectionally reflective extension leash having omnidirectional reflectivity, and wherein the omnidirectionally reflective retractable pet leash is in the fully retracted position.
Figure 4B:
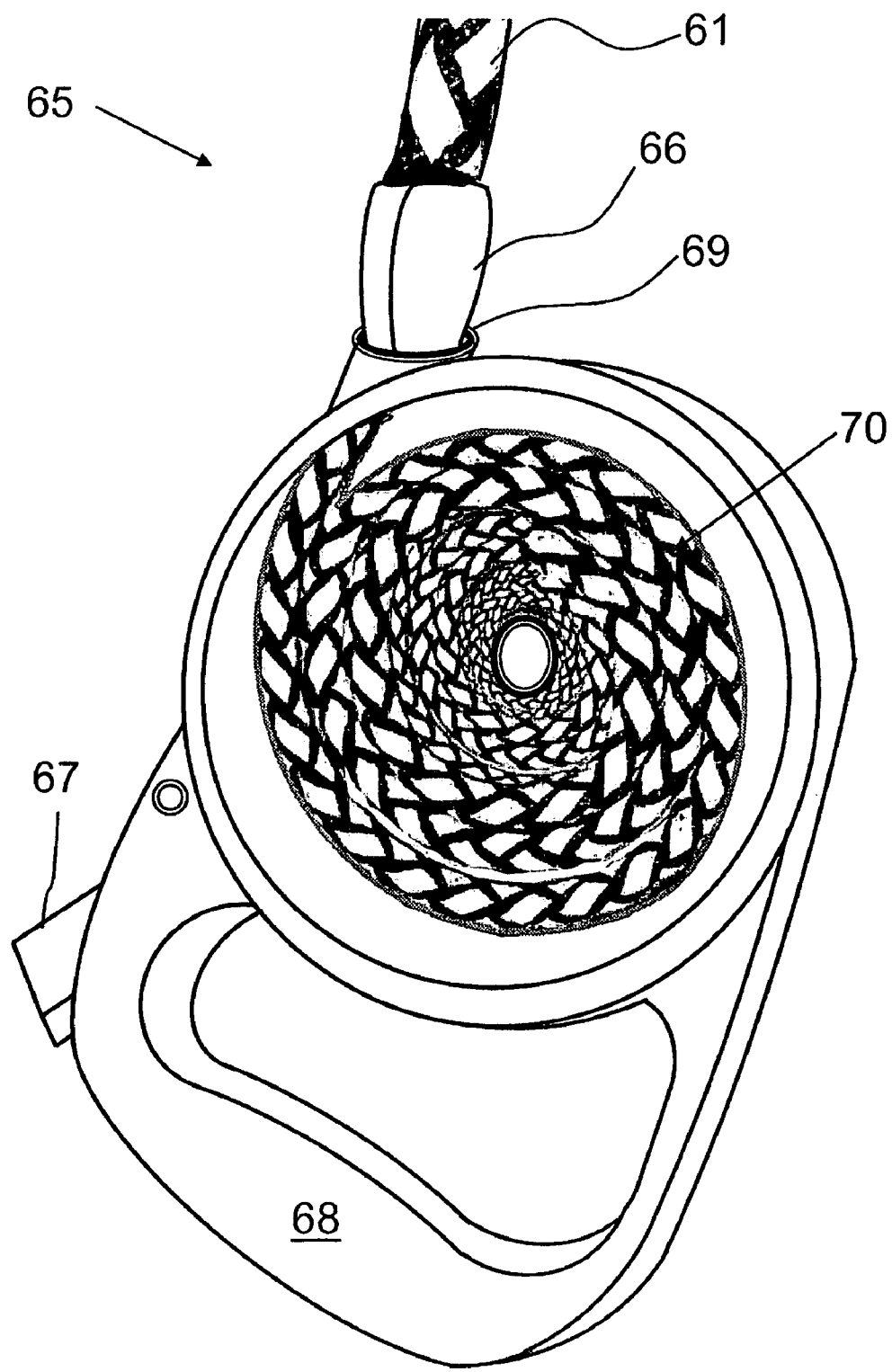
FIG. 4b is a cross sectional view showing the omnidirectionally reflective retractable pet leash wound around a reel and being retained and housed within the internal chamber of the retractable housing, as when the leash is in a non-extended or fully retracted position.
Figure 4C:
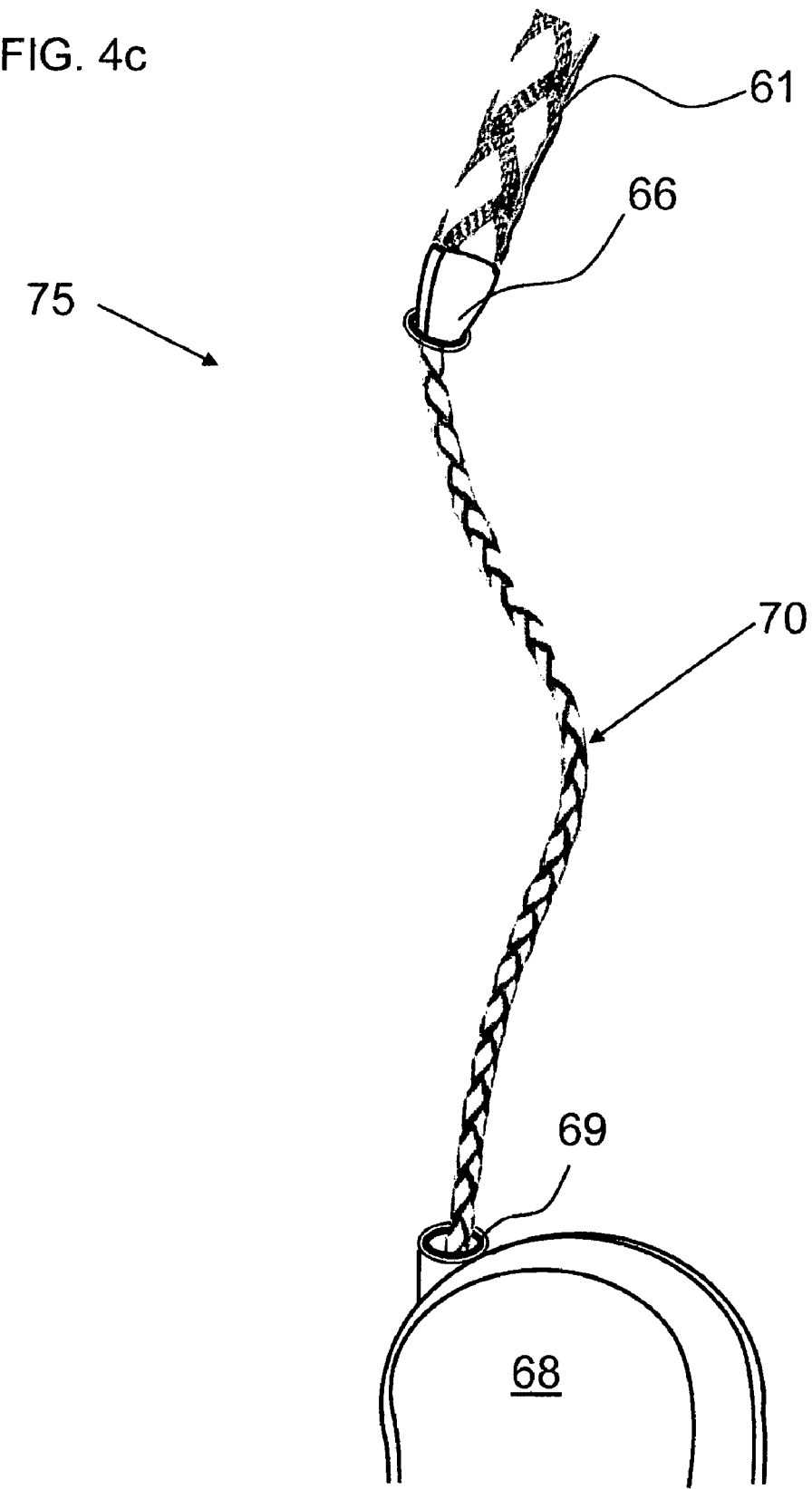
FIG. 4c is a cross sectional view showing a portion of the omnidirectionally reflective retractable pet leash extended from the retractable housing device, as when the leash is being extended.

FIGS. 4a-4c illustrate a preferred embodiment wherein the extension leash is constructed as an omnidirectionally reflective extension leash having omnidirectional reflectivity. In FIGS. 4a and 4b the omnidirectionally reflective retractable pet leash is in the fully retracted position, housed within the retractable housing device, shown at 60 and 65, respectively. FIG. 4c shows the omnidirectionally reflective retractable pet leash with a portion thereof extended from the retractable housing device, shown generally at 75. Omnidirectionally reflective extension leash 61 is fixedly attached to omnidirectionally reflective retractable leash 70 (not shown in FIG. 4a, but shown in FIGS. 4b and 4c) at stopper 66, and appends from retractable housing device 68. Omnidirectionally reflective retractable leash 70 is housed when in the fully retracted position. As pulling force is applied to omnidirectionally reflective extension leash 61, and the retraction control switch 67 is manually placed in the unlock position, omnidirectionally reflective pet leash 70 begins to unwind and traverses extension-retraction aperture 69 as it exits retraction housing device 68. The omnidirectionally reflective retractable pet leash 70 may vary in size from the omnidirectionally reflective extension leash 61 (mm/cm). The omnidirectionally reflective extension leash 61 may have a greater diameter size than omnidirectionally reflective retractable pet leash 70 and the extension-retraction aperture 69. Omnidirectionally reflective pet leash 70 is smaller in diameter that extension-retraction aperture 69 so that the leash 70 can readily pass through extension-retraction aperture 69.

Extension leash is an omnidirectionally reflective extension leash 61 constructed with a cylindrical reflective braided extension sleeve comprising three or more narrow width reflective strips braided at a shallow cylindrical braid angle operable to surround a central cylindrical braided extension rope core thereby providing omnidirectional reflectivity to the extension leash 61. Preferably, the cylindrical reflective braided extension sleeve of the omnidirectionally reflective extension leash 61 is substantially coated with a conformal transparent polymeric abrasion resistant coating to mitigate damage of the reflective properties.

Hardware component 62, herein shown as a clasp 63 appointed to be releaseably connected to a pet collar, is attached to omnidirectionally reflective extension leash 61. The hardware component may vary in structure. The reflective braid is braided around hardware component 62. In another embodiment, hardware component 62 comprises an adjustable metallic tab having a plurality of apertures connected to a pet leash clamp thereby forming a pet collar having non-choke functionality and omnidirectional reflectivity. Alternatively, omnidirectionally reflective extension leash 61 has an end being looped and braided and attached to a hardware component to form a pet collar having omnidirectional reflectivity as is shown in FIG. 5, shown at 100.

Figure 5:
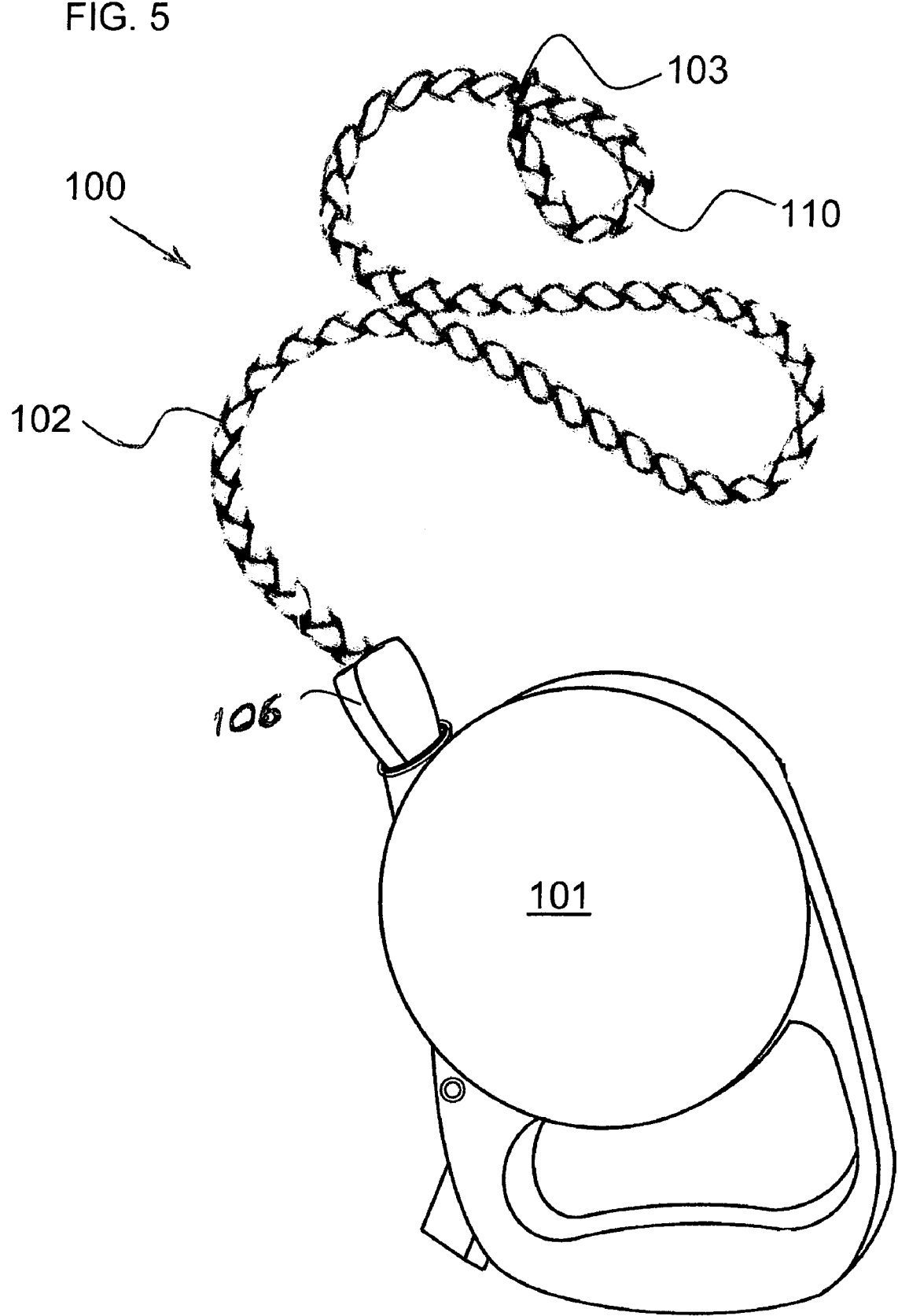
FIG. 5 is a top plane view of cross sectional view of another embodiment of the omnidirectionally reflective retractable pet leash, showing the omnidirectionally reflective extension leash having an end being looped and braided and attached to a hardware component to form a pet collar having omnidirectional reflectivity.

In FIG. 5, omnidirectionally reflective retractable pet leash (not shown because is in the fully retracted position) is housed within retractable housing device 101. Omnidirectionally reflective extension leash 102 is fixedly attached to the retracted omnidirectionally reflective retractable leash (not shown) at stopper 106, and appends from retractable housing device 101. Extension leash is constructed herein as an omnidirectionally reflective extension leash 102 structured with a cylindrical reflective braided extension sleeve comprising three or more narrow width reflective strips braided at a shallow cylindrical braid angle operable to surround a central cylindrical braided extension rope core thereby providing omnidirectional reflectivity to the extension leash 102. Omnidirectionally reflective extension leash 102 has an end being looped and braided and attached to a hardware component 103 to form a pet collar 110 having omnidirectional reflectivity. The collar 110 is generally of a choker type functioning collar.

The key features of the abrasion resistant omnidirectionally reflective retractable pet leash includes, in combination, the features set forth below:

1. a pet leash comprised of a central cylindrical braided rope core composed of braided nylon or polypropylene fibers capable of sustaining tensile forces developed by pet leash loads;
2. the central cylindrical braided rope core being covered substantially with a transparent abrasion resistant conformal coating applied to a cylindrically reflective braided sleeve;
3. the cylindrically reflective braided sleeve formed by cylindrically braiding narrow width reflected strips, formed from knitted, woven or braided nylon, or polypropylene narrow width strips, having a flexible nylon retroreflective sheet, comprising a flexible retroreflective sheet thermally bonded onto a nylon mesh strip, sewn to the surface thereof;
4. each of the flexible retroreflector sheets being prepared by bonding corner cube geometry retroreflectors to a flexible polymeric sheet using a transparent binder;
5. such flexible retroreflector sheets alternately being prepared by bonding microsphere geometry retroreflectors to a metallized reflective flexible polymeric sheet using a transparent binder;
6. each of the flexible retroreflective sheets being thermally bonded to a nylon mesh strip to form a flexible nylon retroreflective sheet;
7. twist and flexure forces acting on the abrasion resistant omnidirectionally reflective retractable pet leash being accommodated by the braided construction of the cylindrical reflective sleeve and the flexibility of abrasion resistant coating;
8. the cylindrical braided sleeve-covered retractable pet leash substantially reflecting incident light back in the same direction as the incident light, clearly indicating the whereabouts of the pet leash handle, pet leash central portion, and the pet leash collar surrounding the neck; and
9. the abrasion resistant omnidirectionally reflective retractable pet leash providing an increased margin of safety for pets and their owners while walking in dimly lit environments, such as parking garages, or inclement weather conditions, where rapidly moving vehicles are encountered.

The abrasion resistant omnidirectionally reflective retractable pet leash disclosed herein can be modified in numerous ways without departing from the scope of the invention. For example, at least one strip of the central braded rope core can be composed of leather. The pet collar can be integral with the central rope core of the extension leash or detachable therefrom via fastening means in the conventional way. These and other modifications are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A reflective retractable pet leash, comprising:
   a. a central cylindrical braided rope core operable to sustain substantial tensile forces;
   b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
   c. said cylindrical reflective braided sleeve substantially coated with a conformal transparent polymeric abrasion resistant coating;
   d. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
   e. said flexible retroreflective sheet having retroreflectors bonded thereto with a transparent bond layer;
   f. said transparent polymeric abrasion resistant coating having a refractive index lower than that of said retroreflectors;
   g. a retractable housing device having a handle portion, a retraction control member actuated by a retraction control switch, a housing body with an internal chamber appointed with a reel member, and an extension-retraction aperture;
   h. an extension leash being appointed to append from said extension-retraction aperture of said retractable housing device and being appointed to accommodate a hardware component operable with a pet collar; and
   i. said retractable leash having a central section, a proximal end section and a distal end section, said proximal end being retained by said reel member so that said proximal end is wrapped around and engages with said reel member, said distal end being attached to said extension leash, wherein said central section of said retractable leash is releaseably spirally arranged within said internal chamber when said retractable leash is in a retracted position and wherein said central section of said retractable leash extends from said internal chamber and traverses said extension-retraction aperture when said retractable leash is in an extended position.

2. A reflective retractable pet leash as recited by claim 1, wherein said central cylindrical braided rope core comprises braided nylon fibers.

3. A reflective retractable pet leash as recited by claim 1, wherein said central cylindrical braided rope core comprises braided polypropylene fibers.

4. A reflective retractable pet leash as recited by claim 1, wherein said cylindrical reflective braided sleeve is braided at a braid angle of 5 to 10 degrees.

5. A reflective retractable pet leash as recited by claim 1, wherein each of said narrow width reflective strips has a width of 0.0065 to 0.25 inches.

6. A reflective retractable pet leash as recited by claim 1, wherein said flexible retroreflective sheet is thermally bonded to said nylon mesh strip with polyvinyl chloride.

7. A reflective retractable pet leash as recited by claim 1, wherein said flexible retroreflective sheet is thermally bonded to said nylon mesh strip with polyvinyl acetate.

8. A reflective retractable pet leash as recited by claim 1, wherein said flexible retroreflective sheet is thermally bonded to said nylon mesh strip with polyurethane.

9. A reflective retractable pet leash as recited by claim 1, wherein said flexible retroreflective sheet comprises a plurality of corner cube retroreflectors.

10. A reflective retractable pet leash as recited by claim 1, wherein said flexible retroreflective sheet comprises a plurality of microsphere retroreflectors bonded to a light-reflecting sheet.

11. A reflective retractable pet leash as recited by claim 1, wherein said flexible retroreflective sheet comprises a plurality of wide angle, exposed retroreflective lenses bonded to a heat activated polyurethane adhesive.

12. A reflective retractable pet leash as recited by claim 1, wherein said flexible retroreflective sheet comprises a plurality of wide angle, exposed retroreflective lenses bonded to a durable cloth backing.

13. A reflective retractable pet leash as recited by claim 1, wherein said retroreflectors have a refractive index in the range of 1.9 to 2.2.

14. A reflective retractable pet leash as recited by claim 1, wherein said transparent polymeric abrasion resistant coating has a refractive index in the range of 1.3 to 1.55.

15. A reflective retractable pet leash as recited by claim 1, wherein said transparent polymeric abrasion resistant coating has a thickness in the range of 0.002 to 0.010 inches.

16. A reflective retractable pet leash as recited by claim 1, wherein said transparent polymeric abrasion resistant coating polymer is a member selected from the group consisting of polyurethane, silicone, polymethyl methacrylate, and polyvinyl acetate.

17. A reflective retractable pet leash as recited by claim 16, wherein said polyurethane is aliphatic polyurethane.

18. A reflective retractable pet leash as recited by claim 16, wherein said polyurethane is melt extruded.

19. A reflective retractable pet leash as recited by claim 16, wherein said polyurethane is dissolved in a solvent and sprayed on the said cylindrical reflective braided sleeve.

20. A reflective retractable pet leash as recited by claim 16, wherein said silicone comprises a silicone composition having a viscosity in the range of 100-275 CPS.

21. A reflective retractable pet leash as recited by claim 1, wherein said extension leash has reflective properties therein.

22. A reflective retractable pet leash as recited by claim 1, wherein said extension leash is an omnidirectionally reflective extension leash constructed with a cylindrical reflective braided extension sleeve comprising three or more narrow width reflective strips braided at a shallow cylindrical braid angle and being operable to surround a central cylindrical braided extension rope core thereby providing omnidirectional reflectivity to said extension leash.

23. A reflective retractable pet leash as recited by claim 22, wherein said cylindrical reflective braided extension sleeve of said omnidirectionally reflective extension leash is substantially coated with a conformal transparent polymeric abrasion resistant coating.

24. A reflective retractable pet leash as recited by claim 22, wherein said omnidirectionally reflective extension leash has an end being looped and braided and attached to said hardware component to form a pet collar having omnidirectional reflectivity.

25. A reflective retractable pet leash as recited by claim 1, wherein said hardware component comprises an adjustable metallic tab having a plurality of apertures connected to a pet leash clamp thereby forming a pet collar having non-choke functionality and omnidirectional reflectivity.

26. A reflective retractable pet leash as recited by claim 1, wherein said hardware component comprises a clasp appointed to be releaseably connected to a pet collar.

27. A reflective retractable pet leash as recited by claim 1, wherein said retractable housing device comprises reflective portions.

28. A reflective retractable pet leash as recited by claim 1, wherein at least one of said narrow width reflective strips has a plurality of microscopic retroreflectors embedded therein.

29. A reflective retractable pet leash as recited by claim 28, wherein said retroreflectors are embedded in each of said strips.

30. A reflective retractable pet leash as recited by claim 28, wherein said at least one strip comprises.

31. A reflective retractable pet leash, comprising:
  a. a central cylindrical braided rope core operable to sustain substantial tensile forces;
  b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
  c. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
  d. said flexible retroreflective sheet having retroreflectors bonded thereto with a transparent bond layer;
  e. a retractable housing device having a handle portion, a retraction control member actuated by a retraction control switch, a housing body with an internal chamber appointed with a reel member, and an extension-retraction aperture;
  f. an extension leash being appointed to append from said extension-retraction aperture of said retractable housing device and being appointed to accommodate a hardware component operable with a pet collar; and
  g. said retractable leash having a central section, a proximal end and a distal end, said proximal end being retained by said reel member so that said proximal end is wrapped around and engages with said reel member, said distal end being attached to said extension leash, wherein said central section of said retractable leash is releaseably spirally arranged within said internal chamber when said retractable leash is in a retracted position and wherein said central section of said retractable leash extends from said internal chamber and traverses said extension-retraction aperture when said retractable leash is in an extended position.

32. A process for manufacture of a reflective retractable pet leash, comprising the steps of:
  a. selecting a braided nylon or polypropylene cylindrical central rope, said cylindrical central rope having an external surface;
  b. selecting a flexible polymer sheet;
  c. coating said flexible polymer sheet with a plurality of retroreflectors using a transparent binder to form a retroreflector coated flexible polymer sheet;
  d. thermally bonding said retroreflector coated flexible polymer sheet to a nylon mesh strip to form a flexible nylon retroreflective sheet;
  e. sowing said flexible nylon retroreflective sheet to a narrow width reflective strip;
  f. braiding at least three of said narrow width reflective strips at a shallow cylindrical braid angle to form an omnidirectionally reflective sleeve having a braided construction;
  g. covering said external surface of said cylindrical central rope with said omnidirectionally reflective sleeve to form a pet leash with omnidirectional reflectivity having a central section, a proximal end and a distal end;
  h. attaching said proximal end of said pet leash to a reel member;
  i. fixing said reel member within an internal chamber of a retractable housing device, said retractable housing device having a handle portion, a retraction control member actuated by a retraction control switch, a housing body with said internal chamber appointed with said reel member, and an extension-retraction aperture;
  j. winding said reel member so that said proximal end becomes wrapped around said reel member and said central section of said pet leash is releaseably spirally arranged within said internal chamber of said retractable housing;
  k. inserting said distal end of said pet leash within said extension-retraction aperture; and
  l. attaching said distal end of said pet leash to an extension leash being appointed to append from said extension-retraction aperture of said retractable housing device and being appointed to accommodate a hardware component operable with a pet collar, said pet leash engaging with said reel member and said extension leash to operate in retracted and extended positions;

wherein said omnidirectionally reflective pet leash being operable to sustain abrasion, substantial tensile forces, and to accommodate twist and flexure forces due to strength and movement afforded by said braided construction of said omnidirectionally reflective sleeve; and wherein said central section of said pet leash is releaseably spirally arranged within said internal chamber when said pet leash is in a retracted position and wherein said central section of said pet leash extends from said internal chamber and traverses said extension-retraction aperture when said pet leash is in an extended position.

33. A process for manufacture of a reflective retractable pet leash as recited in claim 32 including a step of applying a transparent flexible polymeric abrasion resistant conformal coating to substantially cover said omnidirectionally reflective sleeve.

* * * * *